Patented June 12, 1945

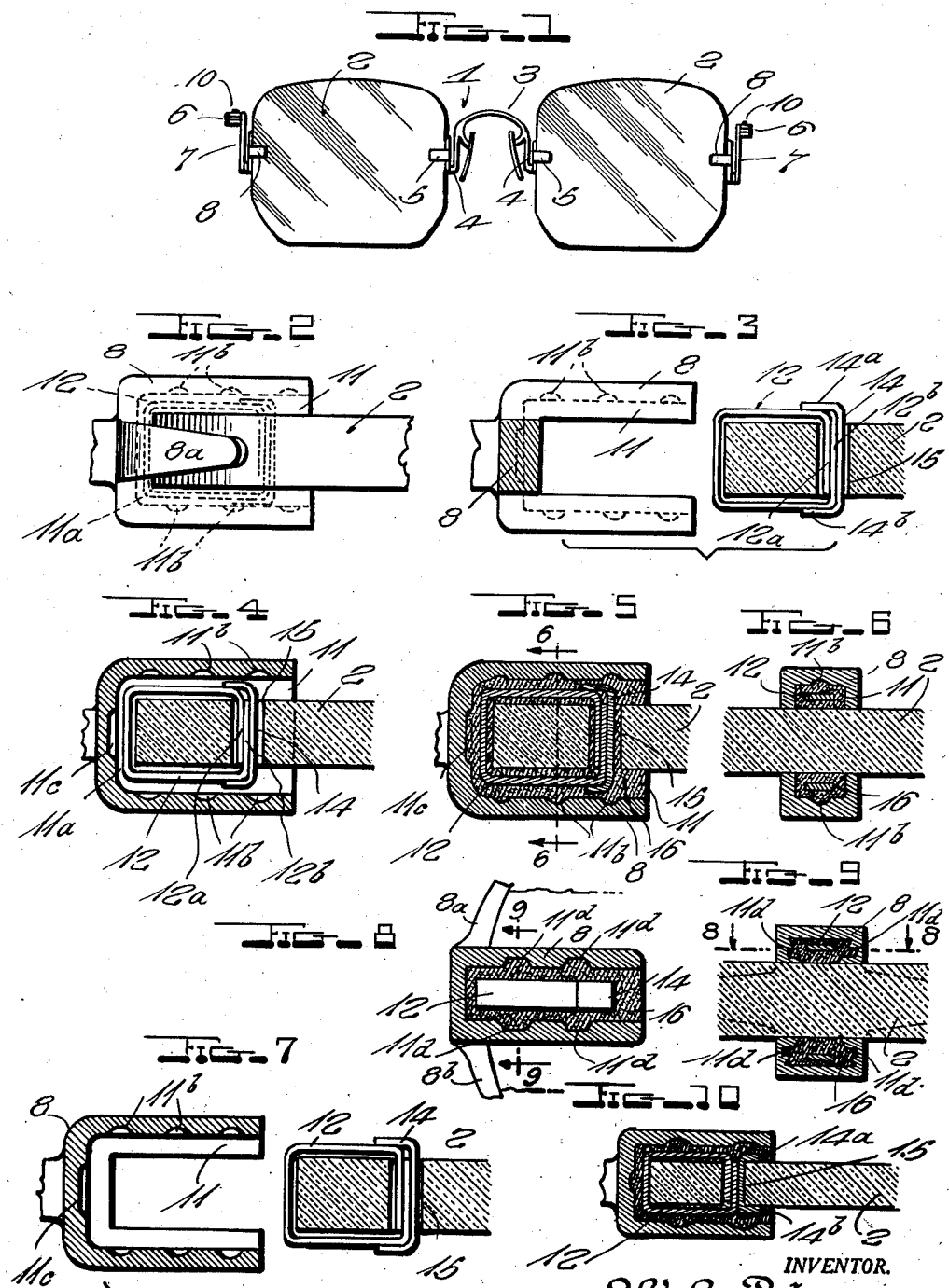

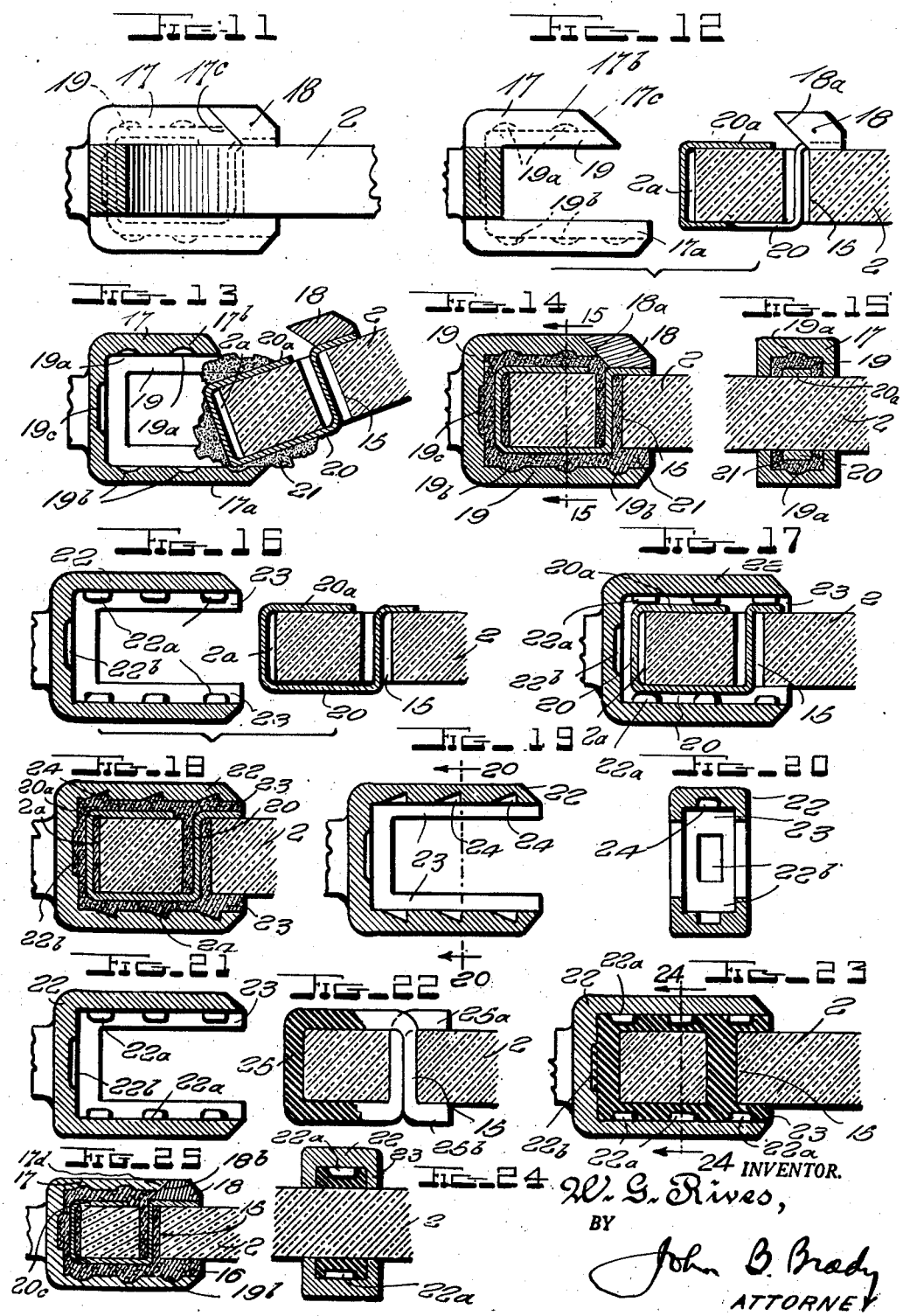

2,377,970

UNITED STATES PATENT OFFICE 2,377,970

MEANS FOR MOUNTING LENSES

William G. Rives, Las Vegas, N. Mex.

Application September 29, 1941, Serial No. 412,851

8 Claims. (Cl. 88—47)

My invention relates broadly to spectacles and more particularly to means for mounting lenses employed in eyeglasses and spectacles.

One of the objects of my invention is to provide a simplified construction of lens mounting means which is inexpensive in manufacture and highly durable in use and which entirely eliminates the need for securing screws and screw threaded straps.

Another object of my invention is to provide an ornamental arrangement of mounting means for lenses in which the headed ends of fastening means are entirely eliminated while insuring a rigid connection between the lenses and the lens mounting means.

Still another object of my invention is to provide a construction of strap for mounting the lenses of spectacles in which the strap is shaped to embrace the edge and opposite faces of the lens adjacent the edge and the internal portion of the strap recessed to receive securing means between the lens and the internal portions of the strap for insuring a rigid interconnection between the mounting means and the lens without the necessity of passing a fastening member entirely through the strap and lens.

A still further object of my invention is to provide an arrangement for mounting lenses in a spectacle frame which employs undercut strap-like members adapted to engage the edges and opposite faces of the lenses with means for anchoring the strap members in position by a mass of relatively low melting point plastic material.

Other and further objects of my invention reside in the arrangement of fastening means interposed between a spectacle frame structure and eye-glass lenses as will be set forth more fully in the specification hereinafter following by reference to the accompanying drawings, in which:

Figure 1 is a front elevational view of a spectacle embodying the construction of my invention; Fig. 2 is a fragmentary top plan view of one form of the lens mounting means; Fig. 3 is a transverse sectional view taken through a portion of a lens and showing one manner of mounting the lens in the lens mounting means; Fig. 4 is a transverse sectional view through the lens mounting means illustrating the lens in position therein prior to the filling of the lens mounting means with plastic material; Fig. 5 shows the lens mounting means of Fig. 4 filled with plastic material for mounting a lens; Fig. 6 is a sectional view taken through the lens mounting means with the plastic in position, the view being taken on line 6—6 of Fig. 5; Fig. 7 is a view of the lens mounting means of Figs. 2–6 and illustrating the manner of positioning the lens mounting means; Fig. 8 shows a modified form of construction for mounting a lens within the lens mounting means, the view being taken on line 8—8 of Fig. 9; Fig. 9 is a transverse sectional view taken on line 9—9 of Fig. 8; Fig. 10 is a sectional view through the lens and mounting means illustrated in Figs. 8 and 9; Fig. 11 shows a modified form of lens mounting means embodying my invention; Fig. 12 is a cross sectional view illustrating the manner of mounting the lens in the lens mounting means of Fig. 11; Fig. 13 illustrates the method of assembly of the lens in the lens mounting means of Figs. 11 and 12; Fig. 14 is a sectional view through the lens and lens mounting means of Figs. 11–13 and showing the plastic material in position for uniting the lens and lens mounting means; Fig. 15 is a transverse sectional view taken on line 15—15 of Fig. 14; Fig. 16 is a longitudinal sectional view through a further modified form of lens mounting means and illustrating the lens about to be inserted in the lens mounting means; Fig. 17 is a longitudinal sectional view showing the lens entirely in position within the lens mounting means; Fig. 18 is a longitudinal sectional view through a lens and lens mounting means and illustrating the manner of uniting the lens and lens mounting means with the aid of a plastic; Fig. 19 is a longitudinal sectional view through the lens mounting means illustrated in Fig. 18; Fig. 20 is a transverse sectional view through the lens mounting means taken on line 20—20 of Fig. 19; Fig. 21 is a view of a further modified form of lens mounting means; Fig. 22 is a view of a lens having a thread-like plastic extending through the apertured portion of the lens and adapted to be embraced by the lens mounting means of Fig. 21; Fig. 23 is a longitudinal sectional view through the lens of Fig. 22 and mounting means of Fig. 21 and showing the manner in which the thread-like plastic is treated to effect a rigid connection between the lens and the lens mounting means; Fig. 24 is a transverse sectional view taken on line 24—24 of Fig. 23; and Fig. 25 is a longitudinal sectional view through a further modified form of lens mounting means embodying my invention.

Referring to the drawings in detail, reference character 1 designates a pair of spectacles having frames constructed in accordance with my invention for supporting the lenses indicated at 2. The bridge is represented at 3 connected through resilient strip members 4 with the lens mounting means 5. The temples of the spectacles which are designated at 6 are hingedly connected at 10 with the ends of the resilient strips 7 which connect to the lens mounting means 8.

The lens mounting means of my invention may be constructed in various forms which I have illustrated in the several views shown in Figs. 2–25, inclusive.

In the form of my invention shown in Figs. 2–7 the lens mounting means 8 for the lens 2 is shown with a longitudinally extending groove 11 therein extending in the transverse path indicated at 11a across the lens mounting means. Recesses 11b are provided in the grooved portion 11 of the lens mounting means 8 to provide an interlocking connection for plastic material serving as the binding medium between the lens 2 and the lens mounting means 8. The transverse portion of the groove 11 indicated at 11a is also provided with a recessed portion 11c into which the plastic material may be interlocked. In order to effect engagement between the grooved portion of the lens mounting means 8 and the lens 2 without the use of securing screws or bolts, I provide a metallic strap 12 which has a width which is somewhat less than the width of the groove 11. The strap 12 is adapted to be bent upon itself and carries an auxiliary strip 14 fastened to one end thereof. The auxiliary strip 14 and the strap 12 are capable of being passed through the aperture 15 drilled in lens 2. The strap 12 may be bent upon itself with the ends 12a and 12b thereof lying immediately adjacent each other and with the auxiliary strip 14 extending adjacent thereto and having the ends 14a and 14b thereof extending in overlapping relationship to the strap 12 in the arrangement illustrated in Figs. 2–9 or with the ends 14a and 14b extending in a direction away from strap 12 as represented in Fig. 10. The ends 14a and 14b of the auxiliary strip serve as an additional anchor in the plastic material 16 which fills the space between the lens 2 and the lens mounting means 8 as illustrated more clearly in Figs. 5–6 and Figs. 8–9. The groove 11 is filled with plastic material having a low melting point and which while soft seeps around the strap 12 and into the recesses 11b and 11c in the groove 11 and forms when hardened a rigid connection between the lens 2 and the lens mounting means 8. The lens mounting means 8 is provided with ears 8a and 8b which form a seat for the peripheral edge of the lens.

In addition to the recesses in the lens mounting means 8 which I have described I may provide lateral recesses 11d in the sides of the lens mounting means 8 into which the plastic material 16 may expand while in a plastic condition and form an interlock between the lens mounting means 8 and the lens 2 when the plastic has hardened.

In the form of my invention illustrated in Figs. 11–15 I have shown the lens mounting means divided into two portions 17 and 18. The portion 17 shown more clearly in Figs. 12 and 13 is provided with a groove 19 therein in the interior sides and inner end thereof into which the lens 2 may be moved. It will be observed that the lens mounting means 17 has arms of different lengths, that is, one arm 17a is longer than the arm 17b. Both arms embrace opposite sides of the lens 2. A strap member 20 is provided fastened at one end to the portion 18 of the lens mounting means and bent to shape to pass through aperture 15 in the lens and wrapped around a groove 2a in the edge of the lens and extending in contact with the opposite face of the lens as represented at 20a. The reason for providing the groove 2a in the edge of the lens is to center the strap 20 and prevent dislodgment thereof as the lens 2 is moved into the lens mounting means and to insure the exact centering of the lens with respect to the center of the lens mounting means. The lens 2 with the strap 20 in position may then be tilted to enter the lens mounting means 17 as illustrated in Fig. 13 with the plastic solder or plastic material 21 accumulated thereon in sufficient quantity to fill the groove 19 when the lens 2 is slid into position as illustrated in Fig. 13. The groove 19 is supplemented by recesses 19a and 19b in the opposite interior faces of groove 19 and by recess 19c in the inner end of lens mounting means 17. When the lens 2 is moved to the position illustrated in Fig. 14 where the face 18a of lens mounting means 18 directly contacts the face 17c of lens mounting means 17, heat is applied to the plastic solder or plastic material 21 which solidifies and expands and forms an interlock between the lens 2 and the lens mounting means 17—18. Various shapes of joints between faces 18a and 17c may be provided to insure a rigid and substantially invisible joint between the lens mounting means and the lens. For example, as I have shown in Fig. 25, the lens mounting means 17 may be undercut on a bias as represented at 17d, while the coacting portion 18 of the lens mounting means may be cut at an angle indicated at 18b complementary to the angular disposition of the face 17d whereby a rigid joint is assured between the two portions of the lens mounting means and a substantial interlock obtained between the lens 2 and the lens mounting means.

I have illustrated in Figs. 16 and 17 a further modified form of my invention in which the lens mounting means illustrated at 22 is provided with a multiplicity of inwardly directed projections 22a disposed in the groove 23 which extends interiorly of the lens mounting means 22. These inwardly extending projections 22a form guide means against which the strap 20 and the turned portion 20a thereof contact and slide for firmly anchoring the lens 2 which carries the strap 20 in position. The plastic solder or other plastic material of low melting point is accumulated on the strap 20—20a before the lens 2 is moved into the lens mounting means. This plastic material seeps between the lugs 22a and into the recess 22b in the end of the lens mounting means 22. When heated, the plastic solder or plastic material expands and solidifies forming a rigid interconnection between the lens 2 and the lens mounting means 22. The fact that lens 2 is grooved at its edge at 2a provides a positive centering means for the strap 20 and insures the entry of strap 20 into groove 23 without dislodgment.

In Figs. 18–20 I have illustrated a further form of my invention in which the lens mounting means 22 is provided with recessed pockets in the inner face of groove 23 substantially in the shape of saw teeth indicated at 24. These saw tooth-like recesses serve as means within which the plastic solder or plastic material may expand and form a multiplicity of abutments restraining the release or removal of the lens 2 from the lens mounting means. The recess 22b in the inner end of the lens mounting means serves as hereinbefore explained, to receive the plastic material and facilitate the interlocking connection between the lens and lens mounting means. The pockets 24 are so shaped that the solidified plastic forms teeth-like members which abut with the tooth-like pockets or recesses 24, thereby preventing longitudinal movement of the lens 2 out of the lens mounting means after the lens 2 has become engaged therein.

In Figs. 21–24 I have shown an arrangement of lens mounting means in which a flexible band of rubber having a low melting point is fastened around the peripheral edge of the lens as illustrated for example in Fig. 22 at 25. The rubber band has the opposite ends thereof drawn through aperture 15 in lens 2 and the ends extended adjacent the opposite faces of the lens 2 as represented at 25a and 25b. The lens mounting means 22 illustrated in Fig. 16 provided with the inwardly projected projections 22a serves to receive the lens 2 with the rubber band 25 thereon by a longitudinal movement of the lens shown in Fig. 22 into the lens mounting means shown in Fig. 21. Heat is then applied to melt the rubber band 25, the material of which melts and runs into the crevices between projections 22a in groove 23 filling the space between the lens 2 and the lens mounting means 22 and interlocking the lens 2 rigidly with the lens mounting means 22 as illustrated more clearly in Figs. 23 and 24.

While I have described my invention in certain of its preferred embodiments, I realize that various modifications of the constructions illustrated herein may be employed and it is my intention that various modifications and arrangements embodying the principles of my invention shall be included within the scope of the appended claims.

What I claim as new and desire to secure by Letters Patent of the United States is as follows:

1. Lens mounting means comprising in combination with an optical lens apertured adjacent the periphery thereof, a strap extending through the aperture in the lens, a bifurcated member having a pair of arms embracing opposite side faces of the lens, said arms being internally grooved with the grooves having a section substantially conforming with the contour of the section of the said strap and adapted to slide over the said strap for embracing the lens adjacent one edge thereof, with portions of said strap disposed within the grooves of said member, and a packing of plastic material interposed between the grooved portion of said bifurcated member, said strap and said lens, the grooved portion of said bifurcated member having recesses spaced at intervals along the inner faces of the grooves for receiving expanded plastic material and establishing a firm interlock between the lens and the bifurcated member.

2. Lens mounting means comprising in combination with an optical lens apertured adjacent the periphery thereof, a metallic strap extending through the aperture in the lens and lying in surface contact with the opposite faces of the lens on opposite sides of the aperture in the lens, a bifurcated member having a pair of arms embracing opposite faces of the lens, said arms being internally grooved and having a section substantially conforming with the section of the said metallic strap and adapted to slide over the said metallic strap for embracing the lens adjacent one edge thereof, with portions of said metallic strap disposed within the grooves of said member and extending substantially parallel with said arms, and a packing of plastic material interposed between the grooved portion of said bifurcated member, said metallic strap and said lens, the grooved portion of said bifurcated member having pockets of tooth-like contour for receiving expanded plastic material and serving as abutments for interlocking through said plastic material the bifurcated member and said lens.

3. Lens mounting means comprising in combination with an optical lens apertured adjacent the periphery thereof, a metallic strap extending through the aperture in the lens and lying in contact with the opposite faces of the lens, a bifurcated member having a pair of arms embracing opposite sides of the lens, said arms being internally grooved and having a section substantially conforming with the section of the said metallic strap and adapted to slide over the said metallic strap for embracing the lens adjacent one edge thereof, with portions of said metallic strap disposed within the grooves of said member and extending substantially parallel with said arms, and a packing of plastic material interposed between the grooved portion of said bifurcated member, said metallic strap and said lens, the grooved portions of said bifurcated member having inwardly extending projections adapted to enter the plastic material and establish a firm interlock therewith for rigidly mounting said lens with respect to said bifurcated member.

4. Lens mounting means comprising in combination with an optical lens apertured adjacent one edge thereof, a metallic strap looped through the aperture in the lens and around the edge thereof and extending substantially parallel with opposite faces of said lens, said metallic strap carrying a supplemental strap having its opposite ends extending adjacent thereto and projecting through the aperture in the lens and extending substantially parallel with the faces of the aforesaid metallic strap, a bifurcated member having a grooved portion embracing said strap and supplemental strap, and a filling of plastic material interposed between said strap, said supplemental strap, said lens and the grooved portion of said bifurcated member for interlocking said lens and bifurcated member.

5. Lens mounting means comprising in combination with an optical lens apertured adjacent one edge thereof, a metallic strap looped through the aperture in the lens and around the edge thereof, said metallic strap carrying a supplemental strap projecting through the aperture in the lens and having the ends extending substantially parallel with the faces of the aforesaid strap, a bifurcated member having an internal groove substantially embracing portions of said strap and supplemental strap and extending substantially parallel with the surfaces of portions of said straps, and a filling of plastic material between said strap, said supplemental strap, said lens and the grooved portion of said bifurcated member for establishing an interlocking connection between said bifurcated member and said lens.

6. Lens mounting means comprising in combination with a lens apertured adjacent the periphery thereof, a flat band-like strap extending through the aperture in the lens, a bifurcated member having a pair of arms containing aligned grooves shaped to substantially conform with the contour of the cross section of said flat band-like strap and engageable with said strap with portions of said strap extending substantially parallel with said arms within said grooves and a packing of plastic material between the aligned grooves in said bifurcated member and said strap for interlocking said bifurcated member and said lens adjacent one edge of the lens.

7. Lens mounting means comprising in combination with a lens apertured adjacent the periphery thereof, a flat strap extending through the aperture in the lens and lying in surface contact with the opposite faces of the lens, a bifurcated member having a pair of arms containing aligned grooves substantially conforming with the contour of the cross section of said strap and engageable with said strap, portions of said strap extending substantially parallel with said arms within said grooves, and a packing of plastic material between the grooves in said bifurcated member and said strap for interlocking said bifurcated member and said lens, the grooves in said bifurcated member including recessed pockets therein for receiving the packing of plastic material whereby said bifurcated member may be secured to said lens.

8. Lens mounting means comprising in combination with an optical lens apertured adjacent the periphery thereof, a flat strap extending through the aperture in the lens and lying in contact with the opposite faces of the lens, a bifurcated member having a pair of arms embracing opposite sides of the lens and extending substantially parallel with the faces of said flat strap, said arms being internally grooved with the internal groove having a section substantially conforming with the contour of the section of the flat strap and adapted to slide over the said strap for embracing the lens adjacent one edge thereof, and a packing of plastic material interposed between the grooves in said bifurcated member, said strap and said lens, the grooves in said bifurcated member including recesses therein for receiving expanded plastic material therein for establishing a firm interlock between said bifurcated member and said lens.

WILLIAM G. RIVES.